United States Patent [19]
Schwab et al.

[11] 3,761,060
[45] Sept. 25, 1973

[54] MIXING AND CONVEYING APPARATUS

[75] Inventors: Johann Schwab, Vienna; Wladimir Hascic, Maria Enzersdorf; Manfred Furnsinn, Traiskirchen, all of Austria

[73] Assignee: Semperit Aktiengesellschaft, Hauptstrasse, Austria

[22] Filed: Dec. 15, 1970

[21] Appl. No.: 98,407

[30] Foreign Application Priority Data
Dec. 23, 1969 Austria ..................... A 12030/69

[52] U.S. Cl. .................. 259/22, 251/324, 259/9, 259/25, 259/27
[51] Int. Cl. ..................... B01f 15/02, B01f 7/08
[58] Field of Search ................. 259/18, 25, 24, 26, 259/60, 97, 9, 10, 21, 22, 23, 191, 27; 222/136, 137, 254, 256, 262, 559; 251/324

[56] References Cited
UNITED STATES PATENTS

| | | | |
|---|---|---|---|
| 3,608,781 | 9/1971 | Flynn | 222/136 X |
| 3,102,004 | 8/1963 | Grintz | 259/7 X |
| 3,062,512 | 11/1962 | Carter | 259/25 |
| 3,021,870 | 2/1962 | Allen | 137/625.4 X |

*Primary Examiner*—John Petrakes
*Assistant Examiner*—Alan I. Cantor
*Attorney*—Ernest F. Marmorek

[57] ABSTRACT

Apparatus for mixing and conveying at least two materials, particularly liquid materials together forming a two or multi-component resin system, comprising a mixing chamber, a mixing and conveying worm located in the chamber, and two feed passages communicating with the chamber through orifices which are obturable by a common sealing piston, wherein in order to ensure simultaneous opening and closing of the orifices, they are located in a plane normal to the direction of travel of the piston. In one embodiment, the piston is carried on and axially movable with the worm, the orifices being formed in the wall of the mixing chamber. Alternatively, the orifices may open into a preliminary chamber, itself opening into the mixing chamber, and in which the piston moves. The leading surface of the piston in the closing position forms a part of the wall of the mixing chamber.

12 Claims, 8 Drawing Figures

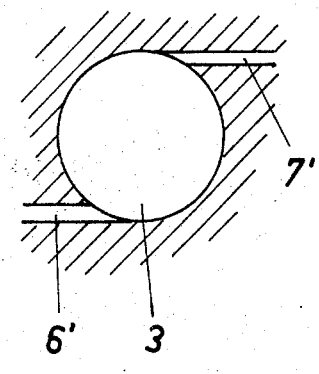
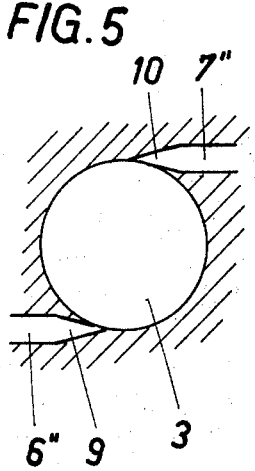
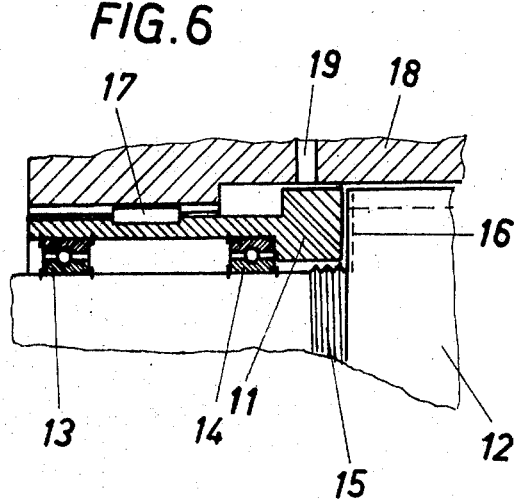
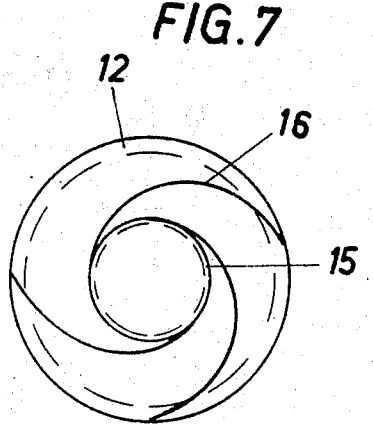
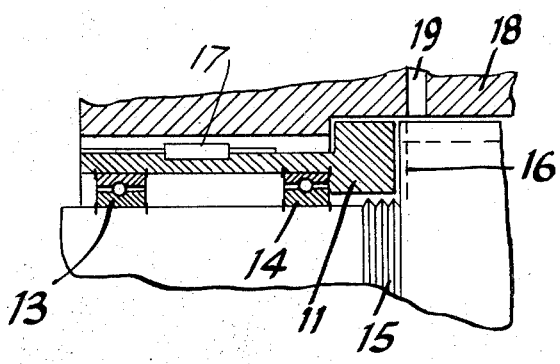

MIXING AND CONVEYING APPARATUS

BACKGROUND OF THE INVENTION

The present invention relates to apparatus for mixing and conveying at least two materails, particularly liquid materials, in particular materials together forming a two-component or multicomponent synthetic resin system.

Mixing and conveying apparatus is known comprising at least one mixing chamber, a conveyor and stirrer worm and at least two obturable feed passages. In known devices of this kind, two or more passages open into the mixing chamber, each passage having its own shut-off device. In the case of reactive synthetic resin systems, in particualr polyurethane systems, an accurate mixing ratio is essential since otherwise substantial differences in the properties of the material formed are encountered. It is necessary, therefore, to introduce the individual components into a mixing chamber in a very accurately dosed manner, the substances then being mixed in and moved out of the mixing chamber by the worm. By adjusting the shut-off devices, it is possible to arrange for a predetermined quantity of the components to flow into the mixing chamber per unit time. The shut-off valves must as far as possible both open and close simultaneously, in order to prevent any lead or lag on the part of a component. In a system employing pneumatic or hydraulic operation of the valves, this simultaneous opening and closing cannot always be achieved since frequently differences in adjustment or the presence of foreign bodies can cause one servo cylinder to operate more slowly than the other. If the valves are to be mechanically coupled, then very precise and elaborate devices are needed and these again do not operate totally without play.

SUMMARY OF THE INVENTION

According to the invention, there is provided apparatus for mixing and conveying at least two materials, particularly liquid materials forming together a two-component or multi-component synthetic resin system, comprising a mixing chamber, agitating and conveying means located within said mixing chamber, and two feed passages leading to said mixing chamber, said passages having respective orifices opening to said chamber and obturable by movement of a common sealing piston, said orifices lying in a plane normal to the direction of travel of said piston.

In one embodiment of the invention, the piston is arranged to form part of the worm.

In another embodiment of the invention, the piston is arranged in a preliminary mixing chamber opening into the mixing chamber, the feed passage orifices being formed in the wall of this auxiliary chamber and the leading surface of the piston forms part of the mixing chamber wall when in the position to close the orifices.

In this embodiment, as the piston in the preliminary chamber is moved away from the mixing chamber, it simultaneously opens the orifices of the feed passages. The components can then flow into the preliminary chamber where they immediately undergo preliminary mixing and thence pass into the mixing chamber proper. When the piston moves in the opposite direction, the openings are closed simultaneously and the material remaining in the preliminary chamber is forced into the mixing chamber. When the piston has reached its closed position, its leading surface forms part of the mixing chamber wall.

In order to avoid the formation of unnecessary recesses or protrusions in the mixing chamber wall, the leading surface of the piston may conveniently be shaped to correspond to the wall of the mixing chamber. This means that where a tubular mixing chamber is used, for example, the leading surface of the piston will have a concave form corresponding to the radius of curvature of the mixing chamber. In this embodiment, however, it should be ensured that when dealing, for example, with two-component systems, the two feed passages open into the preliminary chamber precisely opposite one another since otherwise the dishing of the leading surface of the piston will mean that the passages are not opened simultaneously.

It is advantageous if the feed passages open into the auxiliary chamber on a line parallel to the axis of the mixing chamber. In this region, the dished leading surface of the piston displays a cutting edge and this is particularly suitable for scraping away any residues of material which may be left behind in the neighbourhood of the feed orifices.

In order to achieve particularly good mixing of the components in the preliminary chamber, conveniently the passages may open into this chamber substantially tangentially. This feature also ensures that, in the event of any extreme pressure difference occurring in the feed passages, there is no possibility of one component penetrating into the passage through which the other arrives and reacting with this other component to block the passage.

An addition increase in the rate of injection of the components into the preliminary chamber can be achieved by forming the passages as nozzles where they open into the chamber.

In order to avoid possible adhesion of parts of the mixture which are already reacting, it is advantageous to arrange for the piston and/or the preliminary chamber to be coated with an adhesion-reducing layer. This layer can, in the case of polyurethane, for example, be of polytetrafluroethylene.

BRIEF DESCRIPTION OF THE DRAWINGS

The invention will now be further described with reference to the drawings, in which:

FIG. 4 is a plan view of one form of the auxiliary chamber of FIG. 1;

FIG. 5 is a plan view of a modified form of the preliminary mixing chamber of FIG. 1;

FIG. 6 is a partial side sectional view of another form of apparatus according to the invention; and FIG. 7 is an end view of the worm of FIG. 6; and FIG. 8 is another operative position of the apparatus of FIG. 6.

Referring to FIGS. 1 and 2, a rotating mixing and conveyor worm 2 is arranged in a mixing chamber 1. Into the mixing chamber 1 there opens a preliminary mixing chamber 3 in which an axially displaceable but non-rotatable piston 4 is disposed. The leading surface 5 of the piston 4 is shaped to accord with the curvature of the wall of the mixing chamber 1 (see FIG. 2). Into the preliminary chamber 3 there open two feed passages 6 and 7 which, because they are arranged in the same plane normal to the axis of the piston, can be closed off simultaneously by the latter when it moves in the chamber 3.

FIG. 3 is a fragmentary view of the preliminary mixing chamber 3. The chamber is provided with a lining 8. The leading surface 5 of the piston 4 is similarly coated with a layer 9. These layers 8 and 9 are made of a materail to which the mixture formed does not adhere.

Figure 1:
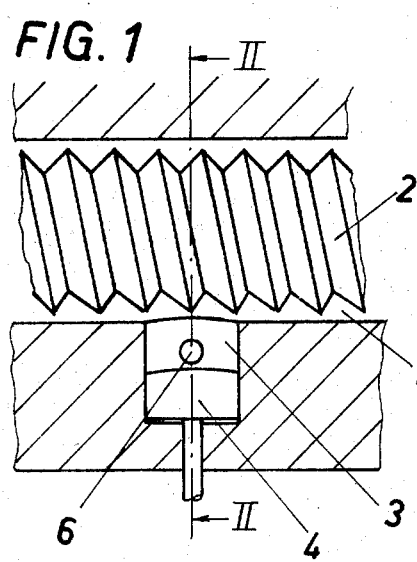
FIG. 1 is a partial side sectional view of one form of apparatus according to the invention.
Figure 2:
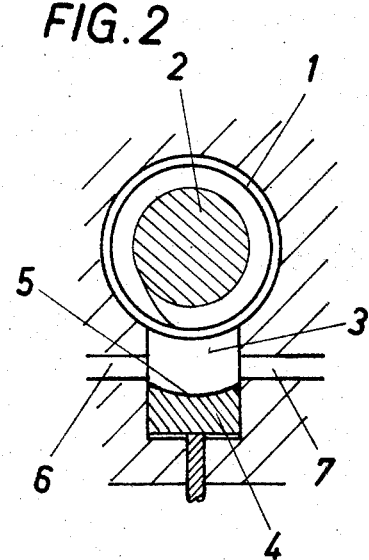
FIG. 2 is a section taken along the line II—II OF FIG. 1.
Figure 3:
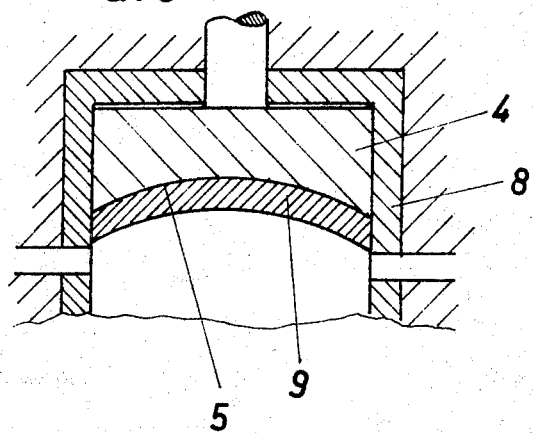
FIG. 3 is a detail of FIG. 2 on an enlarged scale.

In the form of preliminary mixing chamber 3 shown in FIG. 4, the passages 6' and 7' open substantially tangentially into the preliminary chamber 3 so that an eddying motion is produced in this chamber, which contributes to the preliminary mixing of the components.

In order to still further improve the speed of the entering material, the passage 6" and 7" (FIG. 5) can be designed as nozzles 9 and 10 respectively in the neighbourhood of their entry into the preliminary chamber 3. The nozzles 9 and 10 can either be formed directly in the preliminary chamber wall or alternatively separately manufactured nozzles cna be inserted therein.

In the embodiment shown in FIGS. 6 and 7, a shut-off piston 11 is disposed concentrically to a mixing and conveyor worm 12 and rotatably mounted thereon through ballbearings 13 and 14. The worm 12 is provided in the neighbourhood of the piston 11 with a helical thread 15 and a spiral 16 (se FIG. 7), these serving to produce a self-cleaning action in the gap. The piston 11 is in turn assembled for displacement in a housing 18, a roll pin 17 being provided. The piston is movable axially with the worm 12 and in the left-hand terminal position opens feed passages 19 whilst in the right-hand terminal position it closes them (FIG. 8). In another embodiment of the concentrical piston 11 as shown in FIG.6, the axially movable piston is carried on a shaft extension of the worm 12 and is axially movable with respect to the worm 12 and thereby opening and closing the orifices 19.

What is claimed is:

1. Apparatus for mixing and conveying at least two materials comprising a mixing chamber, agitating and conveying means in said mixing chamber, two feed passages communicating with said mixing chamber through respective orifices, and a common sealing piston movable by sliding flush over said orifices beteen an open and closed position respectively to open and close said orifices, the axes of said orifices lying in a plane normal to the direction of travel of said piston, said piston in said open position thereof lying completely to one side of said orifices.

2. Apparatus as claimed in claim 1 wherein said agitating and conveying means is a worm.

3. Apparatus as claimed in claim 2 wherein said piston is carried on and axially movable with said worm.

4. Apparatus as claimed in claim 1 including a preliminary chamber opening into said mixing chamber wherein said piston is movable in said preliminary chamber, wherein said orifices are formed in the walls of said preliminary chamber, and wherein the leading surface of said piston when in the position to close said orifices forms part of the wall of said mixing chamber.

5. Apparatus as claimed in claim 4 wherein said preliminary chamber is located below said mixing chamber.

6. Apparatus as claimed in claim 4 wherein at least one of the wall of said preliminary chamber and the leading surface of said piston is coated with a material to which the mixture formed in said preliminary chamber in use will not adhere.

7. Apparatus for mixing and conveying at least two materials comprising a mixing chamber, agitating and conveying means in said mixing chamber, two feed passages communicating with said mixing chamber through respective orifices, and a common sealing piston movable to open and close said orifices, the axes of said orifices lying in a plane normal to the direction of travel of said piston, including a preliminary chamber opening into said mixing chamber wherein said piston is movable in said preliminary chamber, wherein said orifices are formed in the walls of said preliminary chamber, snd wherein the leading surface of said piston when in the position to close said orifices forms part of the wall of said mixing chamber, wherein each of said feed passages opens substantially tangentially to said preliminary chamber.

8. Apparatus for mixing and conveying at least two materials comprising a mixing chamber, agitating and conveying means in said mixing chamber, two feed passages communicating with said mixing chamber through respective orifices, and a common sealing piston movable to open and close said orifices, the axes of said orifices lying in a plane normal to the direction of travel of said piston, including a preliminary chamber opening into said mixing chamber wherein said piston is movable in said preliminary chamber, wherein said orifices are formed in the walls of said preliminary chamber, and wherein the leading surface of siad piston when in the position to close said orifices forms part of the wall of said mixing chamber, wherein each of said feed passages is formed as a nozzle at its opening into said preliminary chamber.

9. Apparatus for mixing and conveying at least two materials comprising a mixing chamber, two feed passages communicating with said mixing chamber through respective orifices, and a sealing member movable flush over said orifices beteen an open and closed position respectively to open and to close said orifices, said orifices lying in a plane parallel to the direction of travel of said sealing member, said sealing member in said open position thereof lying completely to one side of said orifices.

10. Apparatus according to claim 9, wherein said sealing member is a piston.

11. Apparatus as claimed in claim 9, further comprising, agitating and conveying means disposed in said mixing chamber.

12. Apparatus as claimed in claim 11, wherein said agitating and conveying means is axially connected to said sealing member.

* * * * *